Jan. 14, 1964

H. F. GERWIG ETAL 3,117,585

ELECTRO-HYDRAULIC CONTROL VALVE

Filed Sept. 12, 1955

Inventors:
Harvey F. Gerwig
Robert M. Cox
Burton D. Floyd
and Gary L. Collins
By:
Donald W. Banner Atty.

Jan. 14, 1964  H. F. GERWIG ETAL  3,117,585
ELECTRO-HYDRAULIC CONTROL VALVE
Filed Sept. 12, 1955  4 Sheets-Sheet 2

Inventors:
Harvey F. Gerwig
Robert M. Cox
Burton D. Floyd
and Gary L. Collins
By: Donald W. Banner Atty.

Jan. 14, 1964  H. F. GERWIG ETAL  3,117,585
ELECTRO-HYDRAULIC CONTROL VALVE
Filed Sept. 12, 1955  4 Sheets-Sheet 3

Inventors:
Harvey F. Gerwig
Robert M. Cox
Burton D. Floyd
and Gary L. Collins
By:
Donald W. Banner  Atty.

United States Patent Office 3,117,585
Patented Jan. 14, 1964

3,117,585
ELECTRO-HYDRAULIC CONTROL VALVE
Harvey F. Gerwig, Glendale, Robert M. Cox, Northridge, Burton D. Floyd, Van Nuys, and Gary L. Collins, Long Beach, Calif., assignors to Weston Hydraulics, Ltd., North Hollywood, Calif., a corporation of California
Filed Sept. 12, 1955, Ser. No. 533,876
26 Claims. (Cl. 137—625.61)

This invention relates to a servo mechanism of the electro-hydraulic type. More particularly, this invention relates to an improved control mechanism in which an electrical signal responsive to the position of an exterior device effects the positioning of a control valve to move the aforementioned exterior device as desired.

Electro-hydraulic servo mechanisms heretofore have been known, and have been found to be useful in servo use in various aircraft and guided missile controls, and have also found usefulness in industrial applications employing automatic equipment. The device of the present invention is a substantial improvement over those prior art devices in that it provides the combination of more rapid response, greater sensitivity, improved control regularity, increased speed of response, adjustability and reliability.

It is, therefore, one object of the present invention to provide a new and improved electro-hydraulic servo mechanism which is a substantial improvement over comparable devices heretofore known.

Another object of the present invention is the provision of an improved mechanism in accordance with the preceding object having electro-magnetic and hydraulic systems isolated from each other.

Another object of the present invention is the provision of a device in accordance with the preceding objects in which a control shuttle is moved rapidly by means of substantial pressure differential at its opposite ends.

Another object of the present invention is the provision of a device in accordance with the preceding objects in which a torque motor effects the pressure differential across the controlled shuttle by means of mechanisms responsive thereto operative in separate hydraulic circuits.

Another object of the present invention is the provision of a device in accordance with the preceding objects in which there is provided improved feed-back mechanism responsive to the position of the control shuttle.

Another object of the present invention is the provision of a device in accordance with the preceding objects of improved mechanical feed-back means including a resilient member responsive to the position of the control shuttle.

Other objects and features of the invention will be readily apparent to those skilled in the art from the specification and appended drawings illustrating certain preferred embodiments in which.

Figure 1:
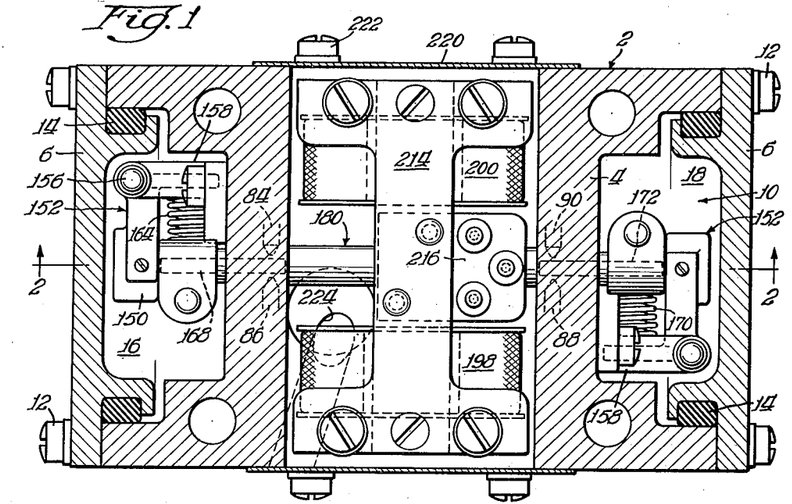
FIGURE 1 is a plan view of the device of the present invention with the top cover removed.
Figure 2:
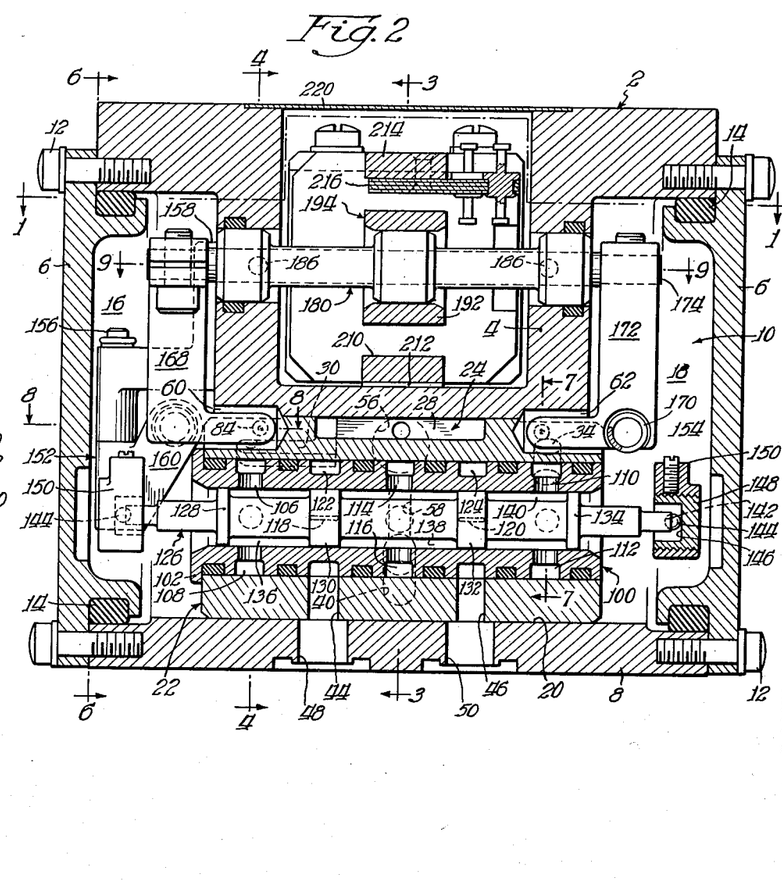
FIGURE 2 is a sectional view along the plane of line 2—2 of FIGURE 1, with parts broken away to facilitate the showing.

Referring now to the drawings, there is illustrated a body 2, best shown in FIGURES 1 and 2, having a generally U-shaped integral portion 4 extending interiorly thereof which, together with end plates 6 and the bottom 8 of the body 2, defines a generally U-shaped opening 10. The end plates 6 are sealably mounted to the body 2, by means of a plurality of bolts 12, the threaded portions of which engage cooperating threads formed in suitable recesses in the body 2. A plurality of seal means 14 are disposed between the end plates 6 and the body 2 to prevent the passage of fluid therebetween.

Figure 10:
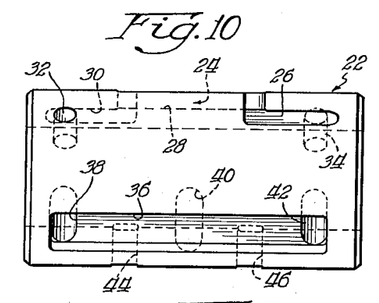
FIGURE 10 is a side elevational view of the outer sleeve employed in the present invention, prior to its assembly into the body.

The U-shaped opening 10 comprises a pair of spaced, vertically extending portions 16 and 18, in the view of FIGURE 2, and a portion 20 interconnecting those vertically extending portions. Disposed within the opening portion 20 in the body 2 is an outer sleeve 22. This sleeve 22, prior to its assembly with the body, is illustrated in FIGURE 10. That figure shows the sleeve 22 as having an outer cylindrical periphery and an inner cylindrical surface and being formed with a "stepped" groove 24 in its outer surface only which includes three longitudinally extending sections 26, 28 and 30, respectively. Furthermore, sleeve 22 is provided with spaced apertures 32 and 34 which extend through it, and with a longitudinally extending slot 36 in its outer surface extending only partially into the wall of the sleeve 22. Through the wall of sleeve 22 there also extends three spaced holes 38, 40 and 42, and two other spaced holes 44 and 46. Holes 38 and 42, respectively, communicate opposite ends of the slot 36 with the interior of sleeve 22.

As previously indicated, the view of FIGURE 10 shows the sleeve 22 prior to its insertion into the body 2. After the sleeve is fabricated with the aforementioned characteristics, the sleeve 22 is placed into a Dry Ice and alcohol atmosphere and cooled to approximately a −100° F. temperature; the body is simultaneously heated to a temperature of approximately 250° F. The sleeve will, manifestly, contract and the body will expand whereupon the sleeve 22 is inserted into the portion 20 of the opening 10 in the body 2. When the parts return to normal temperature, the sleeve 22 will thereby be fixedly positioned within the body 2 with the outer cylindrical surface of the sleeve 22 in fluid-tight engagement with a cooperating cylindrical surface within the body 2.

Prior to the assembly of the sleeve within the body, the body is provided with holes 48, 50 (FIGURE 2), 52 and 54 (FIGURE 3), all of which communicate opening portion 20 in the body 2 with the exterior of the body through the bottom surface—from the view of those figures—of the device. As will be seen from FIGURES 2 and 3, when sleeve 22 is inserted into the body 2, it is so positioned that the holes 44 and 46 thereof respectively register with the holes 48 and 50 within the body. Similarly, hole 40 in the sleeve 22 registers with the hole 54 of the body, and hole 52 of the body is disposed in fluid communication with a portion of the slot 36 in the sleeve 22.

Subsequent to the assembly of the sleeve 22 within the body 2, an aperture 56 is drilled into the subassembly (FIGURE 3), into fluid communication with the section 28 of stepped slot 24 in the sleeve 22; in addition, a channel 58 is drilled into the sleeve 22 and the body 2 to establish fluid communication between the hole 54 and the aperture 56. Furthermore, longitudinally extending chambers 60 and 62 (FIGURE 2) are drilled into the sleeve-body subassembly, the chamber 60 being in fluid communication with the opening portion 16 of the opening 10, while the chamber 62 is in fluid communication with the portion 18 of the opening 10. As may be seen in FIGURE 4, two laterally extending apertures 64 and 66 are then drilled into the sleeve-body subassembly, the aperture 64 being in fluid communication with both the holes 32 in the sleeve 22 and chamber 60. Similarly, as may be seen in FIGURE 7, two laterally extending apertures 68 and 70 are also drilled into the body-sleeve subassembly, the aperture 68 being both in fluid communication with the portion 26 of the slot 24 and the chamber 62, while the aperture 70 is in fluid communication with both the hole 34 in sleeve 22 and the chamber 62.

Figure 3:
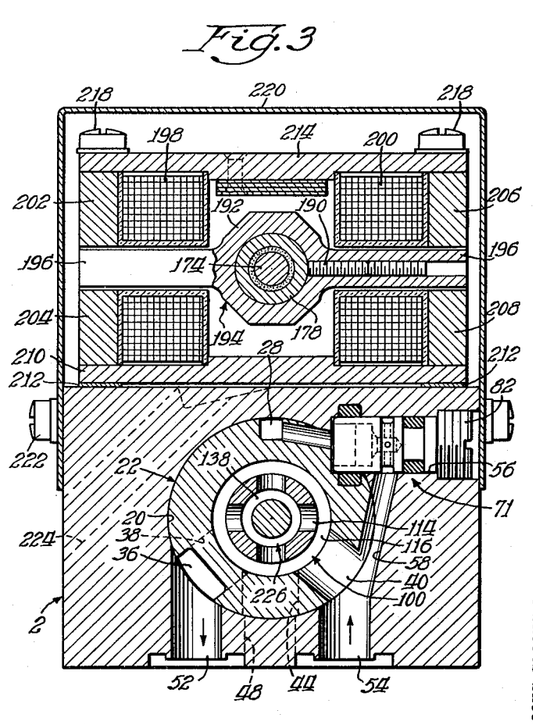
FIGURE 3 is a sectional view along the plane of line 3—3 of FIGURE 2.
Figures 4, 5:
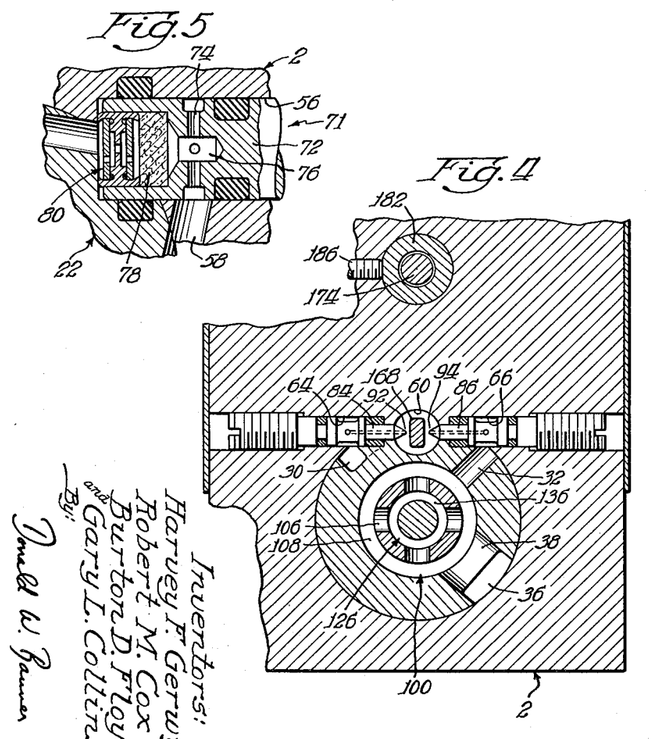
FIGURE 4 is a sectional view along the plane of line 4—4 of FIGURE 2.
FIGURE 5 is an enlarged view of the restrictor illustrated in FIGURE 3.

Disposed within the aperture 56 is a restrictor, suitably sealed within the aperture, as best illustrated in FIGURE 5. This restrictor—indicated in general by the numeral 71—comprises a body portion 72 in which is formed a transverse channel 74 extending therethrough and which is in fluid communication with a longitudinally extending opening 76 having an enlarged, cup-shaped end portion. Within this enlarged portion of the opening 76, there is a filter 78 which is to remove all large particles from the fluid, and assembly 80 comprising of three spaced plates mounted in a suitable retainer, each of the plates, as shown in FIGURE 5, having a minute orifice therein. These openings, as illustrated in FIGURE 5, are not aligned with each other so that a substantial fluid pressure drop occurs as fluid passes therethrough, as will be discussed hereinafter. To maintain the assembly 71 in position, there is provided a screw 82, also positioned in the aperture 56 as illustrated in FIGURE 3, which cooperates with a suitably threaded portion of the aperture 56.

In each of the apertures 64, 66 (FIGURE 4), 68 and 70 (FIGURE 7), there is, respectively, disposed a nozzle member 84, 86, 88 and 90, each being sealed within their associated aperture and held in position by suitable fastening means, such as the screws illustrated. Each of the nozzle members comprises a laterally extending opening therethrough which is in fluid communication with a longitudinal opening extending to the tip of the nozzle member. As illustrated in FIGURE 4, the tips of the nozzle members 84 and 86 are disposed within the chamber 60, and respectively are provided with orifices 92 and 94 disposed within that chamber. As may be seen in FIGURE 7, the nozzle members 88 and 90 are provided with orifices 96 and 98, respectively, in fluid communication within the chamber 62. It will be seen, therefore, that fluid passing outwardly through orifice 92 into chamber 60 normally may exhaust from that chamber through orifice 94. Similarly, fluid passing into chamber 62 through orifice 96 normally may leave that chamber through orifice 98.

Figure 7:
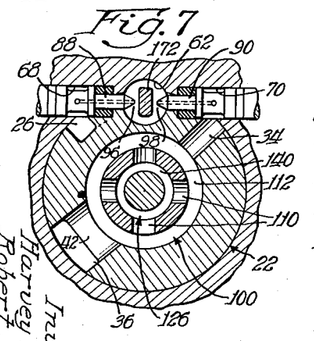
FIGURE 7 is a sectional view along the plane of line 7—7 of FIGURE 2.
Figure 8:
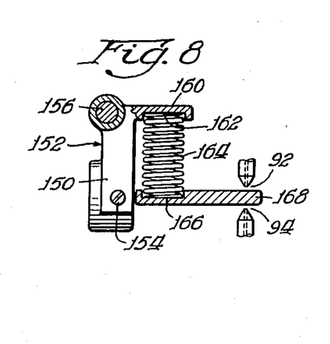
FIGURE 8 is an enlarged partial, sectional view, with parts broken away to facilitate the showing, along the plane of line 8—8 of FIGURE 2.

Within the sleeve 22 is a generally cylindrical inner sleeve 100 having a plurality of lands and grooves in its outer surface, the periphery of the lands closely engaging the inner surface of sleeve 22, and certain of the grooves receiving sealing rings, as illustrated in FIGURE 2, to prevent fluid flow longitudinally between the sleeves 22 and 100. The sleeve 100 is fixed in position within the sleeve 22 by means of a flanged end 102 thereon and screws 104 engaging end 102 and extending into suitable cooperating openings in the sleeve 22. As best illustrated in FIGURE 4, the sleeve 100 is provided with four longitudinally aligned, circumferentially spaced openings 106 communicating the interior of the sleeve 100 with the exterior annular groove 108 (FIGURE 2) in its outer surface. Similarly, as best seen in FIGURE 7, sleeve 100 is also provided with four other longitudinally aligned and circumferentially spaced openings 110 which serve to communicate the interior of the sleeve 100 with the exterior annular groove 112 (FIGURE 2) in its outer periphery. As shown in FIGURE 3, four other openings 114 are also provided in the sleeve 100, communicating the interior thereof with exterior annular groove 116 (FIGURE 2) in that sleeve. As also illustrated in FIGURE 2, sleeve 100 is further provided with longitudinally spaced metering orifices 118 and 120 which communicate the interior of sleeve 100 with its exterior annular grooves 122 and 124, respectively. It will be obvious from an inspection of FIGURE 2 that when sleeve 100 is positioned within sleeve 22, the exterior annular grooves 122 and 124 in sleeve 100 are respectively aligned with holes 44 and 46 in sleeve 22; these latter holes, as previously described, are respectively aligned with holes 48 and 50 in the body 2.

The interior, cylindrical surface of the sleeve 100 is carefully machined to have a lap fit with a longitudinally movable shuttle member 126 disposed therein, and which extends therethrough. This shuttle 126 is best illustrated in FIGURE 2, and comprises an elongated member having four spaced lands 128, 130, 132 and 134 respectively spaced longitudinally, and which are in fluid-tight engagement with the inner surface of the sleeve 100. Between the lands 128 and 130 on the shuttle 126 is a portion of reduced diameter, thereby providing an annular chamber—as illustrated in FIGURE 4—between those lands. Similarly, the portion of shuttle 126 interconnecting lands 130 and 132 is also of reduced diameter so as to provide—as best illustrated in FIGURE 3—a cylindrical chamber 138 between those lands. Furthermore, the portion of shuttle 126 between lands 132 and 134 is also of reduced diameter to provide—as illustrated in FIGURE 7—an annular chamber 140 between those lands. Shuttle 126 is further provided with elongated portions at its opposite ends, each such portion terminating in a recess 142 within which is disposed a bearing 144.

Figures 6, 11:
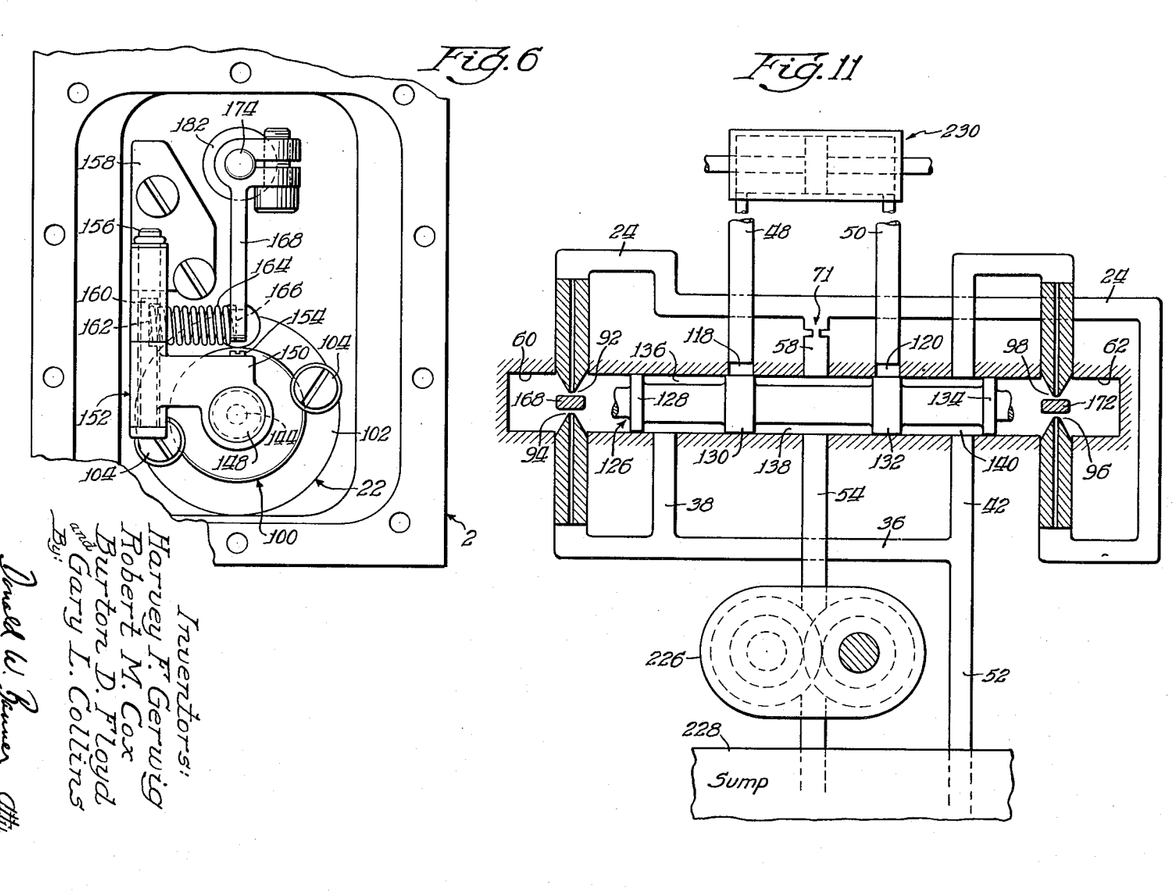
FIGURE 6 is a sectional view along the plane of line 6—6 of FIGURE 2.
FIGURE 11 is a schematic diagram illustrative of the hydraulic circuits in the present invention.

The device of the present invention is bilaterally similar, and as a result, the description of one end thereof will be sufficient to enable those skilled in the art to understand the construction of both ends. With particular reference to FIGURES 2 and 6, each of the bearings 144 is disposed in engagement with the flat bottom 146 of a generally cup-shaped recess formed in an insert 148. Each of the inserts 148 has a generally cylindrical exterior which is provided with threads disposed in engagement with mating threads formed in a circular aperture in one arm 150 of a bell crank 152. The inserts 148 are maintained in position within their respective arms 150 by means of set screws 154, the position of the inserts being readily adjustable to achieve the desired positioning of the shuttle 126.

Each of the bell cranks 152 is pivotally mounted about a pin 156 which extends through a suitable opening in a bracket 158, fixedly mounted to the body 2 by suitable means such as the screws illustrated, the pins 156 being provided with suitable retainer means at either end to hold the bell cranks 152 in position. Each of the bell cranks 152 has an integral, angularly upwardly extending arm 160, the most inwardly portion thereof being provided with a recess 162.

Considering now the left end portion of the device of the present invention, from the view of FIGURE 2, and as best illustrated in FIGURE 6, the recess 162 shown therein receives one end of a spring 164, the opposite end of which is received in a suitable recess 166 in a generally L-shaped arm 168. The end of arm 168 is disposed in chamber 60, as shown in FIGURE 4, between orifices 92 and 94. At the right side of the device, from the view of FIGURE 2, there is provided a spring 170, similar to spring 164, one end of which is disposed within a suitable recess 162 in a bell crank 152 while the opposite end is received in a suitable recess in a generally L-shaped arm 172. One end of arm 172 is disposed in chamber 62, as shown in FIGURE 7, between orifices 96 and 98.

As best illustrated in FIGURE 1, the brackets 158, the bell cranks 152 and the springs 164 and 170 are respectively at opposite sides of a plane extending vertically through the device of the present invention.

Figure 9:
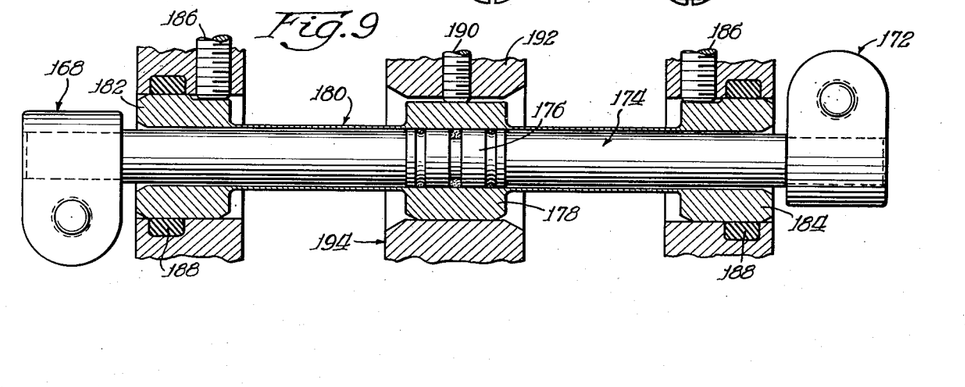
FIGURE 9 is a sectional view along the plane of line 9—9 of FIGURE 2.

The upper ends of the arms 168 and 172 are respectively mounted—by means of forked end portions integral therewith and the illustrated bolts—to opposite ends of a torque rod 174. As best illustrated in FIGURE 9, the rod 174 has an enlarged central section 176 which is silver brazed or fastened by a thermosetting bonding agent and cross pin to an enlarged central section 178 of a torque tube 180. The opposite ends of the torque tube are provided respectively with enlarged end portions 182 and 184 disposed within cooperating apertures in the portion 4 of the body 2, and fixed to the body by means of set screws 186, suitable seals 188 being provided between the enlarged end portions of the torque tube 180 and the associated portions of the body to prevent the passage of fluid therebetween. The torque tube is preferably formed of a torsionally flexible, fluid impervious material such as beryllium-copper, and the thickness of its walls between the enlarged end portions and the enlarged central portion being very thin. It will, therefore, be seen that when a torque is applied to the central portion 178 of the tube 180—by means to be subsequently explained—the opposite ends of the tube 180 will not move inasmuch as they are fixed to the body 2; the rod 174, however, will be rotated about its longitudinal axis by virtue of its connection to the tube 180 at center portion 178. As will be obvious from the drawings, rotation of the rod 174 effects common rotation of the arms 168–172, for a purpose to be explained later.

The enlarged central portion 178 of the torque tube 180 is fixedly connected, by means of a set screw 190, to an enlarged central portion 192 of an armature 194 formed of ferro-magnetic material. As best illustrated in FIGURE 3, the armature 194 has a central circular opening therein through which the torque tube 180 extends, armature 194 including integral arms 196 extending outwardly from the enlarged central portion 192. Associated with the armature 194 are coils 198 and 200 and pole pieces 202, 204, 206 and 208. The assembly is disposed upon a bottom plate 210 and the assembly is adjustably positioned with respect to the armature 194 by means of shims 212 inserted between the plate 210 and the body 2 to achieve the desired air gap between the arms 196 of the armature 194 and the respective associated pole pieces. The assembly also includes an end plate 214 having a terminal plate 216 attached thereto, by means of rivets or the like, the plate 216 carrying terminals electrically connected to the coils. Bolts 218 are provided for maintaining the assembly of the elements, and an outer housing 220 is fixed to the body, by means of suitable bolts 222, to protect the torque motor comprising the armature and coils. A suitable hole 224 is provided from the torque motor chamber, and extends through the body 2 in a manner so as to be disassociated from the hydraulic circuits and to carry the electrical wire from the torque motor to the electrical supply source.

Attention is now directed to the highly simplified schematic flow diagram of FIGURE 11, which illustrates the general hydraulic circuitry employed in the present invention. There is schematically represented therein a supply of pressurized fluid, such as the pump 226 adapted to draw the fluid from a sump 228 or other source to which the return line 52 is connected. The pump 226 is adapted to supply fluid to the input hole 54 at a substantial pressure which may be of the order of 3000 p.s.i., this fluid filling the annular chamber 138 and the channel 58 which conducts this fluid to the restrictor 71; the fluid pressure on the opposite sides of the restrictor is approximately 200 p.s.i. in one embodiment of the present invention. FIGURE 11 further illustrates the shuttle 126 in a suitable chamber and its integral lands 130 and 132 which, in the normal position of the shuttle, respectively block the flow through orifices 118 and 120. These orifices 118 and 120 are respectively in fluid communication with orifices 48 and 50, the latter being in turn connnected hydraulically to opposite ends of a controlled device, schematically represented as a double acting piston 230. Suitable electrical control circuitry, which may be a balanced push-pull D.C. amplifier (not shown), would be provided to transmit electrical signals to the coils 198 and 200 (of FIGURE 3) in response to the position of the movable element of the controlled device.

In a normal condition of the device, illustrated in schematic FIGURE 11, the flow of pressurized fluid to, and from, the double acting cylinder 230 is blocked by the lands 130 and 132 of the shuttle 126. Fluid at reduced supply pressure is continually flowing through restrictor 71 and the orifices 92 and 96 to fill the chambers 60 and 62, respectively. Fluid flows outwardly from the chamber 60 through the orifice 94, the slot 36, the hole 52 to the sump 228. Similarly, fluid flow outwardly from the chamber 62 through the orifice 98, chamber 140, the holes 42 and 52 to the sump 228. As previously stated, in this normal condition, one end of arm 168 is disposed within the chamber 60 midway between the orifices 92 and 94. Inasmuch as arms 168 and 172 are effectively connected for common movement by virtue of their connection to the rod 174, the end of arm 172 is disposed within the chamber 62 and midway between the orifices 96 and 98.

Assuming a suitable signal is received from the aforementioned amplifier circuit so that the armature is rotated from its neutral position, and that this movement is transmitted through the torque tube 180 (connected to the armature) to the rod 174, the arms 168 and 172 will be rotated. Assuming that they will be rotated so that the ends thereof will move upwardly, in the view of FIGURE 11, it will be seen that the end of arm 172 will engage and prohibit further fluid flow through the orifice 98. Inasmuch as this orifice was previously connected to the return line, the pressure in the chamber 62 will increase to approximately the reduced supply pressure of 200 p.s.i. Simultaneously, the end of arm 168, disposed in the chamber 60, will engage the orifice 92 to prohibit further fluid flow therethrough; inasmuch as further entry of reduced supply pressure is thereby prohibited, and inasmuch as the orifice 94 is connected to the return line, the pressure in chamber 60 will be reduced to substantially zero pressure. It should be noted that one portion of each of the chambers 60 and 62 is defined by an end land on the shuttle 126 in this schematic representation. As a result, approximately 200 p.s.i. is applied to the exposed area of end land 134 of the shuttle 126 to effect its movement toward the left in the view of FIGURE 11 and this movement is unopposed by any fluid pressure in the chamber 60. (The amount of movement of the shuttle 126 is controlled by means to be subsequently explained.) Assume that shuttle 126 has been moved to the left so that the land 130 uncovers the orifice 118, and the land 132 uncovers the orifice 120; high pressure fluid (3000 p.s.i.) will then pass from the pump 126 to the annular chamber 138, orifice 118 and hole 48 to one side of the piston in the double acting cylinder 230. Simultaneously, the opposite side of the piston in the double acting cylinder 230 is vented through hole 50, orifice 120, chamber 140 and hole 52 to the sump. It will be obvious that the piston within the double acting cylinder 230 will thereby be moved either to the extremity of its permissible movement or until such time as the shuttle 126 is once again returned to its neutral position as illustrated in FIGURE 11. This will be more fully explained hereinafter.

It will further be obvious that opposite movement of shuttle 126 may be accomplished by rotating the ends of arms 168 and 172, illustrated in FIGURE 11, in a downward direction from the view of that figure.

Considering now the actual structure of the present invention in its normal condition, as illustrated in FIGURES 1 through 10, the torque tube 180 normally holds the armature 194 in a central position, the arms 196 thereof being equally spaced from the pole pieces 202, 204, 206 and 208. The torsional rate of the torque tube—that is to say, the increased torque for deflection—is designed to be approximately the same as the de-centering rate of the torque motor. (Thus, as the armature of the torque motor is rotated, it will approach one set of poles and become more spaced from the other set. As this occurs, the magnetic characteristics will cause an attracting force to assist this rotation so that the greater the rotation, the greater the assisting force becomes. To balance this assisting force, the torque tube bias rate is designed to be approximately the same as that of the torque motor. Thus, as the armature deflects and receives a magnetic bias, the torque tube produces a resisting torque approximately equal to the magnetic torque.) Fluid at a substantial pressure—for example, 3000 p.s.i.—is supplied to the hole 54. Part of this fluid passes through the hole 40 in sleeve 22 to fill the annular chamber 138 between the lands 130 and 132. Another portion of this high pressure fluid passes through channel 58 into aperture 56 in which is disposed, as previously described, the restrictor assembly 71. As the fluid passes through the restrictor assembly 71, a substantial pressure drop occurs so that reduced supply pressure—which may be of the order of 200 p.s.i.—is introduced into the groove 24 in the sleeve 22.

A portion of this fluid in the groove 24 passes into the section 26 thereof, from which it flows into aperture 68 and through nozzle member 88—including its integral orifice—into the chamber 62. As the chamber 62 is, in effect, an extrusion of portion 18 of the U-shaped opening 10 in the body 2, fluid will fill portion 18 and chamber 62.

It should be particularly noted at this time that this fluid is prevented from passing through that aperture in portion 4 of the body 2 which receives the enlarged end portion 184 of torque tube 180. As will be recalled, this end portion 184 is fixed in position, and seal means 188 are disposed in engagement therewith so that fluid flow between the enlarged end portion 184 and the associated wall of that aperture in portion 4 receiving portion 184 is prevented. As a result, fluid flow through that aperture into the chamber in which the torque motor is disposed is prevented.

This fluid in chamber 62 and portion 18, in the normal condition of the device, is continually exhausted through orifice 98 in nozzle member 90, this exhausted fluid passing through aperture 34 in sleeve 22 into the annular groove 112 in the inner sleeve 100, from which it is exhausted through aperture 42 and slot 36 in the sleeve 22 and hole 52—in communication with slot 36—to the return or sump.

Another portion of the fluid introduced from restrictor assembly 71 into the groove 24 in the sleeve 22 passes into the section 30 thereof, into aperture 64 and nozzle member 84, through orifice 92 in that nozzle member and into the chamber 60; chamber 60 is, in effect, an extension of portion 16 of the U-shaped opening 10 in the body 2; as a result, fluid will fill portion 16 as well as chamber 60.

It is important to note that this fluid is also prevented from passing through that aperture in portion 4 of the body 2 which receives the enlarged end portion 182 of torque tube 180. This end portion 182 is also fixed in position, and seal means 188 are disposed in engagement therewith so that fluid flow between the enlarged end portion 182 and the associated wall of that aperture in portion 4 receiving portion 182 is prevented. As a result, fluid flow through that aperture into the chamber in which the torque motor is disposed is also prevented. It will, therefore, be seen that the torque motor is completely isolated from the hydraulic fluid.

This fluid in chamber 60 and portion 16 in the normal condition of the device is continually exhausted through orifice 94 in nozzle member 86. This fluid then passes through aperture 32 in sleeve 22 and into annular groove 108 in the inner sleeve 100, from which it is exhausted through aperture 38 and slot 36 in the sleeve 22 and hole 52—in communication with slot 36 to the return or sump.

As electrical current is passed through the coils 198 and 200, the armature will be directed toward the appropriate pole pieces, and the motor is designed to produce an output force which is directly proportional to the differential electrical current flow in the coils. This force is applied to the central portion of the torque tube 180. Inasmuch as the ends of tube 180 are prevented from movement, the tube 180 will twist. In view of the fact that the torque rod 174 is connected to the central portion of the tube 180, the twisting of that tube will effect rotational movement of the rod 174 about its longitudinal axis. The arms 168 and 172, fixed to the opposite ends of rod 174, will thereby be commonly rotated about the longitudinal axis of rod 174. Assuming once again that the current input to the coils is such that the arms 168 and 172 are rotated so as to effect engagement between the arm 168 and orifice 92 and simultaneous engagement of the arm 172 and the orifice 98, it will be seen that further flow of fluid (at the reduced supply pressure of 200 p.s.i.) into chamber 60 (and portion 16 of opening 10 in communication therewith) will be prevented. It will further be seen that passage of fluid out of chamber 62 (and portion 18 of opening 10 in communication therewith) is simultaneously prevented. As a result, the pressure in chamber 62 and opening 18 will increase to approximately 200 p.s.i.; simultaneously the pressure in chamber and portion 16 will drop to the supply pressure. The high pressure in portion 18 of the opening 10, acting on the area of land 134 exposed thereto, will effect movement of the shuttle 126 toward the left, from the view of FIGURE 2. This movement of the shuttle will be substantially unopposed by the fluid in portion 16 inasmuch as direct flow thereof to the return line is permitted.

When shuttle 126 is moved to the left from the view of FIGURE 2, the land 130 integral therewith will uncover a portion of metering orifice 118 in sleeve 100; the land 132 will uncover a portion of metering orifice 120 in that sleeve. The source of high pressure is then, as previously described, in fluid communication with the left side of the piston in double acting cylinder 230 through hole 54 in the body 2, hole 40 in sleeve 22, annular groove 116 in the sleeve 100, openings 114 in that sleeve, annular chamber 138, orifice 118 in the sleeve 100, annular groove 122 in sleeve 100, hole 44 in sleeve 22 and hole 48 in the body 2.

Simultaneously, the opposite side of the piston in the double acting cylinder 230 is exhausted through hole 50 in the body 2, hole 46 in the sleeve 22, groove 124 in the sleeve 100, metering orifice 120 in that sleeve, annular chamber 140 between the lands 132 and 134 on the shuttle, openings 110 in sleeve 100, annular groove 112 in that sleeve, hole 42 and slot 36 in sleeve 22, and hole 52 of the body which, as previously described, is disposed in fluid communication with a portion of the slot 36 (see FIGURE 3) and is adapted for connection to a return line.

It will be obvious that the input to the electrical coils may be such that the armature and the torque tube 180 are twisted in the opposite direction from that heretofore assumed so that the pressure will increase in the chamber 60 (and opening portion 16) and will decrease in the chamber 62 (and opening portion 18) to effect a movement of the shuttle 126 to the right, from the view of FIGURE 2. Upon such rightward movement of shuttle 126, the source of high pressure, as previously described, is in fluid communication with the right side of the piston in double acting cylinder 230 through orifice 54 in the body 2, hole 40 in the sleeve 22, groove 116 in sleeve 100, openings 114 in that sleeve, annular chamber 138 between shuttle lands 130 and 132, orifice 120 in the sleeve 100 and annular groove 124 in that sleeve, hole 46 in sleeve 22, and hole 50 in the body 2. Simultaneously, the left side of the piston in the double acting cylinder 230 is exhausted through hole 48 in the body 2, hole 44 in the sleeve 22, groove 122 and metering orifice 118 in sleeve 100, annular chamber 136 between the shuttle lands 128 and 130, openings 106 in sleeve 100 and annular groove 108 in that sleeve, hole 38 and slot 36 in sleeve 22, and hole 52 of the body and the return line connected thereto.

The flow output of the device of the present invention is controlled with extreme accuracy. More specifically, it will be obvious that the degree of movement of the shuttle 126 determines the rate of flow output of this device inasmuch as shuttle 126 controls the flow through metering orifices 118 and 120. When electrical current is applied to the coils to produce a force in the armature proportional to this current flow, this armature force is applied through the torque tube 180 to the torque rod 174. Assuming that the direction of rotation of rod 174 is the same as previously described, shuttle 126 will be moved toward the left in FIGURE 2. As this movement of shuttle 126 proceeds, increasing amounts of orifices 118 and 120 are opened as the lands 130 and 132 on the shuttle move relative to those orifices. Simultaneously, the bearing 144 at the left end of shuttle 126 will apply a force to insert 148 in the bell crank 152 at the left of the device in FIGURE 2. That bell crank will thereby rotate about its associated pin 156, and the integral arm 160 of that bell crank will compress spring 164 to urge the arm 168, rod 174, torque tube 180, armature 194 and arm 172 back to their neutral position, illustrated in the figures. It will be obvious that upon such neutralization, the pressures in opening portions 16 and 18 are once again equalized. The degree of force applied by spring 164 to effect this neutralization of the parts is manifestly directly proportional to the degree of movement of shuttle 126. When shuttle 126, therefore, is moved sufficiently so that the bias of spring 164 is sufficiently great to equal the force due to the electrical input, this neutralization of the parts will be effected. Upon such neutralization, the shuttle 126 will stop its leftward movement inasmuch as the pressure in portions 16 and 18 will rapidly be equalized. Shuttle 126 will, therefore, remain in a particular, desired displaced position. Inasmuch as the aforementioned actions and reactions occur with great rapidity, it is manifest that the flow output of the device of the present invention is controlled with extreme accuracy and will follow any current input within its response limits. Should an increased current be applied to the coils with the same polarity as the original assumed current, shuttle 126 will be moved further to the left to further uncover orifices 118 and 120 to increase the flow output. It is also apparent that neutralization of the arms 168-172 and the armature will once again occur, as previously described, when the shuttle has moved sufficiently so that spring 164 applies sufficient bias to arm 168 to effect neutralization of those parts.

It is obvious when the current input to the coils is such that the shuttle 126 is moved to the right, from the view of FIGURE 2, opposite to the direction described in detail herebefore, the bell crank 152 on the right side of the device of the present invention will rotate about its associated pin 156 in such a manner that the spring 170 is compressed between the right bell crank and arm 172 to effect the heretofore described neutralization of the parts. In this case, high pressure fluid will be obviously introduced on the right side of the piston in the double acting cylinder 230, and fluid at the left side of that piston will be exhausted. The shuttle 126 will remain in its displaced rightward position as long as the current which effected its movement to that position continues to flow through the coils.

With the shuttle in any position displaced from the neutral position, as previously described, either spring 164 or spring 170 will be applying a force to the associated end of the shuttle 126 through one or the other of the bell cranks 152. Therefore, upon termination of current flow through the coils, the compressed spring will operate through its associated bell crank to urge the shuttle 126 back toward its neutral position, illustrated in FIGURE 2. Simultaneously, the compressed spring will move its associated arm (168 or 172) in a direction momentarily to increase the pressure in the portion (16 or 18) toward which the shuttle was originally moved so that shuttle 126 is also urged back toward its neutral position by this pressure increase. As indicated, this is only a momentary pressure increase inasmuch as the opposite spring (that is to say, the spring not originally compressed by the shuttle movement) will become immediately operative, upon movement of its associated arm away from the neutral position, to return that arm—as well as the other arm—to the neutral position whereby pressure on both ends of the shuttle are equalized and the shuttle will remain in its neutral condition.

From the foregoing description of the operation of the structure, it will be apparent that the shuttle 126 will move rightwardly or leftwardly as desired to effect particular output fluid flow from the device; that after the shuttle has been moved, for example, to the left from its neutral position it may thereafter be moved to a variety of positions to the left of neutral as desired without returning to the neutral position; that after the shuttle has been moved to the right of neutral the same flexibility is possible; that the shuttle, obviously may be moved from one side of neutral to the other side as desired; and that changes in the output flow are effected with extreme rapidity.

It should also be noted that in the device of the present invention, the torque motor comprising the armature and coils is completely isolated from all hydraulic fluid. In addition, only a single shuttle is utilized eliminating the need for both pilot and slave shuttles frequently found in prior devices. In this connection, it should be noted that the device of the present invention advantageously provides fluid pressure chambers at opposite ends of the shuttle in communication with spaced portion thereon and means in those chambers to vary the pressures therein and thereby effect shuttle movement. It should further be particularly noted that the arrangement is such that differential pressure effective to cause operation of the shuttle is substantially the entire fluid supply pressure whereby the shuttle is moved with extreme rapidity. More specifically, this arrangement is such that a significantly greater force level is available to effect movement of the shuttle inasmuch as the pressure in one chamber is increased and the pressure in the opposite chamber is decreased correspondingly so that more power is available to effect rapid and accurate shuttle movement. This is a substantial improvement over mechanisms having a pressure change in but one chamber—such as found in single orifice type mechanisms—while the pressure in the opposite chamber remains the same. Furthermore, the control of the pressure in the fluid pressure chambers at the opposite ends of the shuttle is effected by a pair of arms (168 or 172) moved simultaneously, the arrangement being such that variables inherently present in the operation of any mechanism of this type tend to be nullified, not only in the movement of the pair of arms from their neutral position to a displaced position, but also in returning from such displaced position to the neutral position. The result of this arrangement by which differential pressures across the shuttle are employed to position the shuttle, pressure at one end increasing while pressure at the opposite end is decreasing, this pressure differential being both achieved and eliminated by means of the double arm arrangement, is such that the sensitivity achieved is significantly greater than that heretofore known.

The device of the present invention further advantageously provides a torque motor having an output force proportional to the electrical input, in combination with resilient means opposing the output force of the torque motor, the resilient means being constructed and arranged to oppose this output force at a varying rate substantially equal to the inherent variation in degree of the output force of the torque motor.

It is also very important to observe that various components of the device of the present invention are readily adjustable to assure desired function of the device and to facilitate its manufacture. More specifically, the torque motor body assembly is adjustable to obtain and maintain the desired air gap around the armature, as previously described; the arms 168 and 172 are readily fixed in any desired position relative to the torque rod 173; the inserts 148 in the bell crank 152 are readily positionable to effect the desired positioning of the shuttle 126 within the body and relative to its associated metering orifices 118 and 120 and properly preload the springs 164 and 170.

The device of the present invention is furthermore one relatively economical and light in weight, it is relatively sturdy, reliable in operation, and substantially linear in its operation.

The device of the present invention has been discussed as controlling the operation of a double acting cylinder, its use is not limited to combinations with such devices; rather this device may be employed with a variety of controlled devices.

The fluid seal and sleeve construction disclosed herein constitutes the subject matter described and claimed in the copending application of Burton D. Floyd entitled Sealing Means, Serial No. 533,875, filed September 12, 1955, now U.S. Patent 2,917,078 issued on December 15, 1959.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An electro-hydraulic servo valve comprising a body having an opening therein, pressure fluid ports in said body, a movable member having spaced portions thereon in said opening movable to a plurality of positions to control the flow of fluid through said ports, means defining a plurality of fluid pressure chambers respectively in communication with spaced portions of said movable member, means normally adapted to connect said chambers simultaneously to a source of high fluid pressure and to a low pressure source, movable means positionable in a neutral position corresponding to equal fluid pressures in said chambers and also positionable in displaced positions to effect nonequal fluid pressures in respective chambers and effect thereby movement of said movable member, electrically responsive means operative to effect movement of said movable means, and mechanical means operable upon movement of said movable member effective to bias said movable member to said neutral position thereof.

2. An electro-hydraulic servo valve comprising a body having an opening therein, pressure fluid ports in said body, a movable member having spaced portions thereon in said opening movable to a plurality of positions to control the flow of fluid through said ports, means defining a plurality of fluid pressure chambers respectively in communication with spaced portions of said movable member, means normally adapted to connect said chambers simultaneously to a source of high fluid pressure and to a low pressure source, a plurality of movable means positionable in a neutral position corresponding to equal fluid pressures in said chambers and also positionable in displaced positions to effect nonequal fluid pressures in respective chambers and effect thereby movement of said movable member, electrically responsive means operative to effect movement of said movable means, and mechanical means operable upon movement of said movable member effective to bias said movable means to said neutral position thereof.

3. An electro hydraulic servo valve comprising a body having an opening therein, pressure fluid ports in said body, a movable member having spaced portions thereon in said opening movable to a plurality of positions to control the flow of fluid through said ports, means defining a plurality of fluid pressure chambers respectively in communication with spaced portions of said movable member, means normally adapted to connect said chambers simultaneously to a source of high fluid pressure and to a low pressure source, a plurality of means movable in unison including portions respectively disposed in said chambers positionable in a neutral position corresponding to equal fluid pressures in said chambers and also positionable in displaced positions to effect nonequal fluid pressures in respective chambers and effect thereby movement of said movable member, electrically responsive means operative to effect movement of said movable means, and mechanical means operable upon movement of said movable member effective to bias said movable means to said neutral positions thereof.

4. An electro-hydraulic servo valve comprising a body having an opening therein, pressure fluid ports in said body, a movable member having spaced portions thereon in said opening movable to a plurality of positions to control the flow of fluid through said ports, means defining a plurality of fluid pressure chambers respectively in communication with spaced portions of said movable member, means normally adapted to connect said chambers simultaneously to a source of high fluid pressure and to a low pressure source, movable means including portions in said chambers positionable in a neutral position corresponding to equal fluid pressures in said chambers and also positionable in displaced positions to interrupt the connection of at least one of said chambers to one of said sources to vary the pressure therein and effect thereby movement of said movable member, electrically responsive means operative to effect movement of said movable means, and mechanical means operable upon movement of said movable member effective to bias said movable means to said neutral position thereof and thereby restore the connection of said one chamber to said one source.

5. An electro-hydraulic servo valve comprising a body having an opening therein, pressure fluid ports in said body, a movable member having spaced portions thereon in said opening movable to a plurality of positions to control the flow of fluid through said ports, means defining a plurality of fluid pressure chambers respectively in communication with spaced portions of said movable member, means normally adapted to connect said chambers simultaneously to a source of high fluid pressure and to a low pressure source, a plurality of means movable in unison including portions respectively disposed in said chambers positionable in a neutral position corresponding to equal fluid pressures in said chambers and also positionable in displaced positions to interrupt the connection of at least one of said chambers to one of said sources to vary the pressure therein and effect thereby movement of said movable member, electrically responsive means operative to effect movement of said movable means, and mechanical means operable upon movement of said movable member effective to bias said movable means to said neutral position thereof and thereby restore the connection of said one chamber to said one source.

6. An electro-hydraulic servo valve comprising a body having an opening therein, pressure fluid ports in said body, a movable member having spaced portions thereon in said opening movable to a plurality of positions to control the flow of fluid through said ports, means defining a plurality of fluid pressure chambers respectively in communication with spaced portions of said movable member, means normally adapted to connect said chambers simultaneously to a source of high fluid pressure and to a low pressure source, a plurality of movable means comprising a pair of spaced arms having portions respectively disposed in said chambers and a common operating member for said arms, said portions being positionable in a neutral position corresponding to equal fluid pressures in said chambers and also positionable in displaced positions to effect nonequal fluid pressures in respective chambers upon movement of said arms by said common operating member and thereby effect movement of said movable member, electrically responsive means operative to effect movement of said movable means, and mechanical means operable upon movement of said movable member effective to bias said movable means to said neutral position thereof and thereby equalize the fluid pressures in said chambers.

7. An electro-hydraulic servo valve comprising a body having an opening therein, pressure fluid ports in said body, a movable member in said opening movable to a plurality of positions to control the flow of fluid through said ports, means in said body defining a plurality of spaced fluid pressure chambers therein respectively in communication with the opposite ends of said movable member, means normally adapted to connect said chambers simultaneously to a source of high fluid pressure and to a low pressure source, a plurality of movable means comprising a pair of spaced arms having portions respectively disposed in said chambers and a common operating member for said arms, said portions being positionable in a neutral position corresponding to equal fluid pressures in said chambers and also positionable in displaced positions to effect nonequal fluid pressures in respective chambers upon movement of said arms by said common operating member and thereby effect movement of said movable member, electrically responsive means operative to effect movement of said movable means, and mechanical means operable upon movement of said movable member effective to bias said movable means to said neutral position thereof and thereby equalize the fluid pressures in said chambers.

8. An electro-hydraulic servo valve comprising a body having an opening therein, pressure fluid ports in said body, a longitudinally movable member in said opening movable to a plurality of positions to control the flow of fluid through said ports, means in said body defining a pair of spaced fluid pressure chambers respectively in communication with opposite ends of said movable member, means normally adapted to connect both of said chambers simultaneously to a source of high fluid pressure and to a low pressure source, a plurality of movable means comprising a pair of spaced arms having portions respectively disposed in said chambers and a common operating member for said arms, said portions being positionable in a neutral position corresponding to equal fluid pressures in said chambers and also positionable in displaced positions to effect simultaneously an increase in pressure in one of said chambers and a decrease in pressure in the other of said chambers upon movement of said arms by said common operating member to effect thereby movement of said movable member, electrically responsive means operative to effect movement of said movable means, and mechanical means operable upon movement of said movable member effective to bias said movable means to said neutral position thereof and thereby equalize the fluid pressures in said chambers.

9. An electro-hydraulic servo valve comprising a body having an opening therein, pressure fluid ports in said body, a longitudinally movable member in said opening movable to a plurality of positions to control the flow of fluid through said ports, means in said body defining a pair of spaced fluid pressure chambers respectively in communication with opposite ends of said movable member, means normally adapted to connect both of said chambers simultaneously to a source of high fluid pressure and to a low pressure source; a plurality of movable means comprising a pair of spaced arms having portions respectively disposed in said chambers, a rod attached to said arms adapted to effect common movement thereof, and a torsionally flexible tube surrounding a portion of said rod and fixedly connected thereto whereby torsional flexure of said tube will effect rotary movement of said rod and arms; said arm portions being constructed and arranged to effect simultaneously an increase in pressure in one of said chambers and a decrease of said pressure in the other of said chambers upon movement of said arms by said rod to effect thereby movement of said movable member, electrically responsive means operative to effect torsional flexure of said tube; and means responsive to movement of said movable member effective to equalize the fluid pressures in said chambers.

10. An electro-hydraulic servo valve comprising a body having an opening therein, pressure fluid ports in said body, a longitudinally movable member in said opening movable to a plurality of positions to control the flow of fluid through said ports, means in said body defining a pair of spaced fluid pressure chambers respectively in communication with opposite ends of said movable member, means normally adapted to connect both of said chambers simultaneously to a source of high fluid pressure and to a low pressure source, a plurality of movable means comprising pair of spaced arms having portions respectively disposed in said chambers and a common operating member for said arms, said portions being constructed and arranged to effect simultaneously an increase in pressure in one of said chambers and a decrease in pressure in the other of said chambers upon movement of said arms by said common operating member to effect thereby movement of said movable member, electrically responsive means operative to effect movement of said movable means, means responsive to movement of said movable member effective to equalize the fluid pressures in said chambers, and means preventing fluid contact with said electrically responsive means.

11. An electro-hydraulic servo valve comprising a body having an opening therein, pressure fluid ports in said body, a longitudinally movable member in said opening movable to a plurality of positions to control the flow of fluid through said ports, means in said body defining a pair of spaced fluid pressure chambers respectively in communication with opposite ends of said movable member, means normally adapted to connect both of said chambers simultaneously to a source of high fluid pressure and to a low pressure source; a plurality of movable means comprising a pair of spaced arms having portions respectively disposed in said chambers, a rod attached to said arms adapted to effect common movement thereof, and a torsionally flexible fluid-tight tube having portions spaced from the center thereof fixed with respect to the body and surrounding a central portion of said rod and centrally fixedly connected thereto whereby torsional flexure of said tube will effect rotary movement of said rod and arms; electrically responsive means operative to effect torsional flexure of said tube, means in said body defining a receptacle for receiving said electrically responsive means, said last-mentioned means including means defining a pair of spaced apertures respectively receiving opposite ends of said tube, sealing means preventing the flow of fluid between the ends of said tube and said aperture defining means whereby fluid contact with said electrically responsive means is prevented, said arms portions being constructed and arranged to effect simultaneously an increase in pressure in one of said chambers and a decrease in pressure in the other of said chambers upon movement of said arms by said rod to effect thereby movement of said movable member, and means responsive to movement of said movable member effective to equalize the fluid pressure in said chambers.

12. An electro-hydraulic servo valve comprising a body having an opening therein, pressure fluid ports in said body, a movable member in said opening movable to a plurality of positions to control the flow of fluid through said ports, means in said body defining a plurality of spaced fluid pressure chambers therein respectively in communication with the opposite ends of said movable member, means normally adapted to connect said chambers simultaneously to a source of high fluid pressure and to a low pressure source, means of fluid impervious material defining an enclosure, aperture defining means in the walls of said enclosure, electrically responsive means disposed within said enclosure, a fluid impervious tube including spaced portions sealably positioned within said aperture defining means whereby fluid flow through the apertures is prevented, said tube being constructed and arranged to be torsionally flexible, means including said electrically responsive means adapted to effect torsional deflection of said tube, an operating member movable in response to torsional deflection of said tube, means responsive to movement of said operating member adapted to effect simultaneous increase in the pressure in one of said chambers and a decrease in the pressure in the other of said chambers whereby said movable member is moved, and means responsive to movement of said movable member effective to equalize the fluid pressures in said chambers.

13. The device defined in claim 12 in which said means responsive to movement of said operating member includes a plurality of portions respectively disposed in said chambers in operative relation with said means normally adapted to connect said chambers to fluid pressure sources and constructed and arranged to vary the connection of said chambers to said pressure sources upon movement of said movable member.

14. The device defined in claim 12 in which said operating member comprises a rod extending through said tube and connected thereto so as to be rotatable upon torsional deflection of said tube.

15. The device defined in claim 12 in which said operating member comprises a rod extending through said tube and connected thereto so as to be rotatable upon torsional deflection of said tube and in which means responsive to movement of operating member comprises arms fixedly attached to said rod and including portions respectively disposed in said chambers, said arms being constructed and arranged to vary the connection of said chambers to said pressure sources upon rotation of said rod.

16. An electro-hydraulic servo valve comprising a body having an opening therein, pressure fluid ports in said body, a movable member in said opening movable to a plurality of positions to control the flow of fluid through said ports, means in said body defining a pair of spaced fluid pressure chambers therein respectively in communication with the opposite ends of said movable member, means normally adapted to connect both of said chambers simultaneously to a source of fluid pressure and to a low pressure source, means of fluid impervious material defining an enclosure within said body, aperture defining means in the walls of said enclosure, electrically responsive means disposed within said enclosure, a fluid impervious tube including spaced portions sealably positioned within said aperture defining means whereby fluid flow through the apertures is prevented, said tube being constructed and arranged to be torsionally flexible, means including electrically responsive means adapted to effect torsional deflection to said tube, a control rod extending through said tube and fixedly connected thereto so as to be rotatable about its longitudinal axis upon torsional deflection of said tube, a pair of arms fixedly mounted respectively to opposite ends of said rod and rotatable therewith, said arms including portions respectively disposed in each of said chambers adjacent said means normally adapted to connect said chambers simultaneously to sources of fluid pressure, said portions being constructed and arranged upon rotation of said rod to vary the connection of said chambers to said pressure sources and thereby simultaneously effect an increase in the pressure in one of said chambers and a decrease in the pressure in the other of said chambers whereby said movable member is moved to vary the flow of fluid through said ports, and means responsive to movement of said movable member effective to equalize the fluid pressures in said chambers.

17. An electro-hydraulic servo valve comprising a body having an opening therein, pressure fluid ports in said body, a movable member in said opening movable to a plurality of positions to control the flow of fluid through said ports, means defining a pair of fluid chambers respectively in communication with opposite ends of said movable member, a pair of orifices in each of said chambers respectively connected to a source of high fluid pressure and to a low fluid pressure source, movable means including portions in each of said chambers constructed and arranged upon movement to inhibit simultaneously fluid flow through a high pressure orifice in one of said chambers and a low pressure orifice in the other of said chambers whereby the pressure in one chamber increases and the pressure in the other chamber decreases to effect movement of said movable member, electrically responsive means to effect movement of said movable means and consequent movement of said movable member, and means responsive to movement of said movable member effective to equalize the fluid pressures in said chambers.

18. An electro-hydraulic servo valve comprising a body having an opening therein, pressure fluid ports in said body, a movable member in said opening movable to a plurality of positions to control the flow of fluid through said ports, means defining a pair of fluid chambers respectively in communication with opposite ends of said movable member, a pair of orifices in each of said chambers respectively connected to a source of high fluid pressure and to a low fluid pressure source, movable means including portions in each of said chambers normally positioned respectively intermediate each pair of orifices and movable into engagement with either of said orifices to inhibit fluid flow therethrough, said movable means being constructed and arranged upon movement to inhibit simultaneously fluid flow through the high pressure orifice in one of said chambers and a low pressure orifice in the other of said chambers whereby the pressure in one chamber increases and the pressure in the other chamber decreases to effect movement of said movable member, electrically responsive means to effect movement of said movable means and consequent movement of said movable member, and means responsive to movement of said movable member effective to equalize the fluid pressures in said chambers.

19. The device defined in claim 18 in which said means responsive to movement of said movable member comprise resilient means operative upon movement of said movable member to bias said portions of said movable means toward the position intermediate said orifice.

20. The device defined in claim 18 in which means of fluid impervious material are provided in said body to form an enclosure for said electrically responsive means, and in which said movable means comprises torsional flexible fluid impervious tube extending through said enclosure and having spaced portions sealably positioned within the walls of said enclosure, a rod disposed within said tube and extending therethrough, said rod being fixedly connected to an inner surface of said tube whereby torsional deflection of said tube effects rotation of said rod, said electrically responsive means upon energization effecting flexure of said tube and consequent rotation of said rod.

21. The device defined in claim 20 in which said means responsive to movement of said movable member comprise resilient means operative upon movement of said movable member to bias said portions of said movable means toward the position intermediate said orifices.

22. In a control valve of the type having a housing formed with fluid inlet and outlet ports and an opening in communication therewith in which a movable shuttle is disposed, shuttle means having spaced portions thereon in the opening movable from a first position to a second position to permit fluid flow between the inlet and outlet ports, a plurality of orifices in communication with said spaced portions respectively, electrically responsive means having a movable means in communication with said orifices and being movable from a neutral position thereof to effect differences between the fluid pressures at spaced portions of said shuttle means to effect movement thereof from said first position and thereby effect fluid flow between the inlet and outlet ports, and mechanical means adapted to effect movement of said electrically responsive means toward said neutral position thereof upon movement of said shuttle means away from said first position.

23. In a control valve of the type having a housing formed with fluid inlet and outlet ports and an opening in communication therewith in which a movable shuttle is disposed, shuttle means having spaced portions thereon in the opening movable from a first position to a second position to permit fluid flow between the inlet and outlet ports, a plurality of orifices in communication with said spaced portions respectively, electrically responsive means having a movable means in communication with said orifices and being movable from a neutral position thereof to effect differences between the fluid pressures at spaced portions of said shuttle means to effect movement thereof from said first position and thereby effect fluid flow between the inlet and outlet ports, and mechanical means adapted to transmit mechanical movement of said shuttle means to said electrically responsive means to urge said electrically responsive means toward said neutral position thereof upon movement of said shuttle means away from said first position thereof.

24. In a control valve of the type having a body with an opening therein in which a movable member is disposed which member has spaced portions thereon and is movable to a plurality of positions to control the flow of fluid through a plurality of fluid ports provided in the body, the combination comprising means defining a pair of fluid chambers respectively in communication with spaced portions of the movable member, a plurality of orifice defining means in fluid communication with said chambers, movable means associated with said orifice means and movable relative thereto to change fluid flow therethrough whereby fluid pressure in said chambers is modified and movement of the movable member is effected, electrically responsive means to effect movement of said movable means and consequent movement of the movable member comprising an armature of electromagnetic material; and a thin, flexible, resilient, fluid impervious, metallic seal in engagement with said armature so as to be movable thereby and in fluid tight engagement with the body effective to isolate the electrically responsive means from fluid passing through the valve.

25. A transfer valve comprising two pairs of magnetic poles of opposite polarity, an armature, and a coil encircling said armature, the ends of said armature extending beyond said coil, whereby one end is in close proximity with one pair of said poles and the opposite end is in close proximity with the other pair of said poles, said coil magnetizing said armature whereby said armature swings toward one of said poles when magnetized by a signal of one sense and swings toward the opposite pole when magnetized by a signal of opposite sense, a housing, fluid operated means including a pair of fluid discharge nozzles in said housing, control means for differentially varying the flow through said nozzles, and means responsive to said difference in fluid flow for amplifying the power due to said difference, and means connecting said armature and fluid control means for actuating the latter by the former including a shaft connecting said armature and fluid control means, a torque tube connected to said shaft and connected to said housing for isolating said magnetic poles, said armature and said coil from said fluid operated means and maintaining said armature and said control means in a position centered relative to said poles and nozzles for a no-signal condition.

26. A transfer valve comprising two pairs of magnetic poles of opposite polarity, an armature, and a coil encircling said armature, the ends of said armature extending beyond said coil, whereby one end is in close proximity with one pair of said poles and the opposite end is in close proximity with the other pair of said poles, said coil magnetizing said armature in response to a signal whereby said armature swings toward one of said poles when magnetized by a signal of one sense and swings toward the opposite pole when magnetized by a signal of opposite sense, flow control means, a housing, a pair of fluid discharge nozzles in said housing, said control means differentially varying the flow through said nozzles, means actuated by said fluid flow difference for amplifying the power due to said difference, a shaft connecting said armature and flow control means for actuating the latter by the former, a torque tube connected to said connecting shaft and connected to said housing for isolating said magnetic poles, said armature and said coil from said fluid operated means and adjustable means for securing said shaft to said armature and for maintaining said armature and said control means in a position centered relative to said poles and nozzles for a no-signal condition.

References Cited in the file of this patent

UNITED STATES PATENTS

| | | |
|---|---|---|
| 1,727,755 | Dickinson | Sept. 10, 1929 |
| 2,267,339 | Paulsen | Dec. 23, 1941 |
| 2,635,581 | Karig | Apr. 21, 1953 |
| 2,709,421 | Avery | May 31, 1955 |
| 2,718,903 | Noon et al. | Sept. 27, 1955 |
| 2,725,077 | Nicholl | Nov. 29, 1955 |
| 2,732,860 | Ray | Jan. 31, 1956 |
| 2,767,689 | Moog | Oct. 23, 1956 |
| 2,775,254 | Stanbury | Dec. 25, 1956 |
| 2,790,427 | Carson | Apr. 30, 1957 |
| 2,797,666 | Chubbuck | July 2, 1957 |
| 2,800,143 | Keller | July 23, 1957 |
| 2,835,265 | Brandstadter | May 20, 1958 |
| 2,853,976 | Gerwig | Sept. 30, 1958 |

FOREIGN PATENTS

| | | |
|---|---|---|
| 493,921 | Belgium | June 1, 1950 |
| 719,275 | Great Britain | Dec. 1, 1954 |
| 728,534 | Great Britain | Apr. 20, 1955 |
| 1,050,510 | France | Sept. 2, 1953 |